(12) United States Patent
Schmidt et al.

(10) Patent No.: US 7,877,257 B2
(45) Date of Patent: Jan. 25, 2011

(54) METHOD AND SYSTEM TO PARAMETERIZE DIALOG SYSTEMS FOR THE PURPOSE OF BRANDING

(75) Inventors: Hauke Schmidt, San Bruno, CA (US); Carsten Bergmann, San Jose, CA (US); Fuliang Weng, Mountain View, CA (US); Rohit Mishra, San Jose, CA (US); Badri Raghunathan, San Francisco, CA (US)

(73) Assignees: Robert Bosch Corporation, Broadview, IL (US); Volkswagen of Anmerica, Auburn Hills, MI (US)

( * ) Notice: Subject to any disclaimer, the term of this patent is extended or adjusted under 35 U.S.C. 154(b) by 1075 days.

(21) Appl. No.: 11/238,511

(22) Filed: Sep. 28, 2005

(65) Prior Publication Data

US 2006/0100875 A1    May 11, 2006

Related U.S. Application Data

(63) Continuation-in-part of application No. 10/952,069, filed on Sep. 27, 2004, now Pat. No. 7,716,056.

(51) Int. Cl.
*G10L 15/00* (2006.01)

(52) U.S. Cl. .................. 704/257; 704/274; 704/270

(58) Field of Classification Search ............... 704/251, 704/257, 231, 258, 7, 9, 270, 275, 270.1, 704/274, 272; 340/425.5
See application file for complete search history.

(56) References Cited

U.S. PATENT DOCUMENTS 6,415,257 B1 * 7/2002 Junqua et al. ............... 704/275
6,598,018 B1 * 7/2003 Junqua ...................... 704/251
7,049,941 B2 * 5/2006 Rivera-Cintron et al. . 340/425.5
7,263,489 B2 * 8/2007 Cohen et al. ................ 704/270
2002/0147593 A1 10/2002 Lewis
2003/0169858 A1 9/2003 Boehmer

FOREIGN PATENT DOCUMENTS

| CN | 1470125 A | 1/2004 |
|---|---|---|
| EP | 1 079 617 A2 | 2/2001 |
| WO | WO 2005/027475 | 3/2005 |

OTHER PUBLICATIONS

Zue, Victor W., et al., "Conversational Interfaces: Advances and Challenges", Proceedings of the IEEE, vol. 88, No. 8, 2000, pp. 1166-1180.
Di Fabbrizio, Giuseppe, et al., "AT & T Help Desk", AT&T Labs, pp. 2681-2684.
Bernsen, Niels Ole, "On-Line User in a Mobile Spoken Dialogue System", EUROSPEECH, 2003, pp. 737-740.
Motiwalla, Luvai, "Speech-Enabled Mobile Learning Application", published in 2005.
European Search Report, Dec. 15, 2006, European Patent Application 06020087.0.
European Search Report, Sep. 17, 2008, European Patent Application 08012184.1-2225.

* cited by examiner

*Primary Examiner*—Huyen X. Vo
(74) *Attorney, Agent, or Firm*—Kenyon & Kenyon LLP

(57) ABSTRACT

A method and system to parameterize a spoken language dialog system, includes providing a storage area to store at least one parameter value, integrating a subcomponent with at least one module of the spoken language dialog system, and configuring the subcomponent to access the at least one parameter value and to adjust an operation or output of the module based on the at least one parameter value.

44 Claims, 2 Drawing Sheets

METHOD AND SYSTEM TO PARAMETERIZE DIALOG SYSTEMS FOR THE PURPOSE OF BRANDING

CROSS REFERENCE TO RELATED APPLICATIONS

This application is a continuation-in-part of U.S. patent application Ser. No. 10/952,069, entitled "Method and System for Interactive Conversational Dialogue For Cognitively Overloaded Device Users", which was filed Sep. 27, 2004, now U.S. Pat. No. 7,716,056 the disclosure of which is incorporated by reference herein in its entirety.

FIELD OF THE INVENTION

The present invention relates to a method and system to parameterize spoken dialog systems for the purpose of branding and/or personalization.

BACKGROUND INFORMATION

Command and control type voice recognition systems may allow users to control devices and services by saying or uttering specific predefined keywords, which the system may understand and link to specific actions. These systems may require that the user learn a specific set of allowed keywords and their mapping to actions.

In contrast to command and control type systems, certain spoken language dialog systems may allow users to interact with devices and/or services under control of the dialog system using mostly unconstrained speech. That is, certain spoken language dialog systems may adopt a more natural language understanding (NLU) approach to interacting with the users. In particular, these systems may use a number of modules that specialize on specific subtasks associated with understanding the meaning of what the user said, generate spoken responses to the user for further clarification, and issue some sort of command or query to a device or service as a result of the dialog with the user.

Manufacturers and service providers may desire to distinguish their products and services from other manufacturers or service providers. Moreover, manufacturers and service providers may desire that their products and services be recognized by consumers as having a particular look and/or feel.

Consumers may desire that the products and/or services they use have certain characteristics, which are not uniformly desired among all consumers. In particular, consumers desire to customize products and/or services according to their personal preferences.

SUMMARY OF THE INVENTION

An exemplary embodiment and/or exemplary method of the present invention may parameterize certain features of a spoken language dialog system for the purpose of creating a particular image or persona of the spoken language dialog system, or a particular device and/or service that is under the control of or associated with the spoken language dialog system. From the perspective of the user, the spoken language dialog system may serve as a central point of contact when interacting with the device or service, and over time the user may develop a personified image or feeling about the device or service, which may in part be influenced by the parameterization of the spoken language dialog system. In this regard, the development of such a personified image or feeling may be referred to as the "branding" or "personalization".

Branding of spoken language dialog systems, or systems that include or are under the control of a spoken language dialog system, may provide manufacturers, such as, for example, vehicle manufacturers, an opportunity to differentiate their products including from those of their competitors, even if the manufacturers use the same or similar technology. For example, branding may be used to attach a specific "look and feel" or "talk and hear" to a vehicle model and its accompanying spoken language dialog system so that the manufacturer may target a vehicle model to a specific group of buyers, and the user may recognize the manufacturer and/or model. In this regard, the spoken language dialog system may be a part of the overall vehicle design and appearance or position to the user add consistency and value. Accordingly, branding and/or personalization may be of high value to the supplier of the technology, to the vehicle manufacturer, and to the users as well.

According to an exemplary embodiment and/or exemplary method of the present invention, a spoken language dialog system may engage one or more users in a voice dialog to negotiate the details of one or more tasks for which the system may perform. In doing so, the voiced output of the system may exhibit certain characteristics with respect to a particular brand identity. In particular, the characteristics may include, for example, a certain tone of voice (e.g., male/female voice, modulation of pitch, etc), choice of words, degree of detail in the answer, degree of repetition of previously uttered phrases and so on.

According to an exemplary embodiment and/or exemplary method of the present invention, the branding characteristics of the system may be made adjustable so that the system may be provided in a manner that is consistent with the design of the environment (e.g., a car) in which the system is embedded into. For example, automotive manufacturers may use spoken dialog parameterization to adjust the behavior of an on-board spoken language dialog system in a manner that is in accordance to the general design of the vehicle and/or user preference.

According to an exemplary embodiment and/or exemplary method of the present invention, access is provided to adjustable parameters in an in-car spoken language dialog system for the purpose of branding. In particular, according to an exemplary embodiment and/or exemplary method of the present invention, access to different settings of these parameters is provided to a manufacturer for different car models or customer groups.

According to an exemplary embodiment and/or exemplary method of the present invention, access is provided to a user of the spoken language dialog system to adjust parameters to allow a personalization of the dialog system. In this regard, the personalization of the spoken language dialog system parameters may include, for example, access to user-specific characteristics which are in turn provided/detected by the components in the spoken language dialog system. In this regard, the user-specific characteristics may include, for example, characteristics of a particular user, male characteristics, female characteristics, dialog style, or speaking style. The user may also define a new profile for a collection of individual parameter settings. In particular, the exemplary embodiment and/or exemplary method of the present invention may provide pre-configuration of settings into a profile, and access to allow the user to choose one of a set of profiles.

An exemplary embodiment and/or exemplary method of the present invention is directed to a method to parameterize a spoken language dialog system, which includes providing a storage area to store at least one parameter value, integrating a subcomponent with at least one module of the spoken language dialog system, and configuring the subcomponent to access the at least one parameter value and to adjust an operation or output of the module based on the at least one parameter value.

According to another exemplary embodiment and/or exemplary method of the present invention, the subcomponent is integrated with a speech recognition module to adjust a conversion of a digitized acoustic sample into at least one of a sequence of words and a directed graph generated by the speech recognition module.

According to another exemplary embodiment and/or exemplary method of the present invention, the subcomponent is integrated with a natural language understanding module to adjust an analysis of at least one of a sequence of words and directed group of word hypothesis for syntactic and semantic structure.

According to another exemplary embodiment and/or exemplary method of the present invention, the subcomponent is configured to adjust the analysis of at least one of a sequence of words and directed group of word hypothesis for syntactic and semantic structure with respect to a user speaking style.

According to another exemplary embodiment and/or exemplary method of the present invention, the subcomponent is integrated with a dialog manager to adjust at least one of an assembly of a command for a device and creation of a response description.

According to another exemplary embodiment and/or exemplary method of the present invention, the subcomponent is configured to adjust the at least one of the assembly of the command for the device and the creation of the response description with respect to a dialog style of the spoken dialog system.

According to another exemplary embodiment and/or exemplary method of the present invention, the dialog style includes a relative response length.

According to another exemplary embodiment and/or exemplary method of the present invention, the subcomponent is configured to adjust the at least one of the assembly of the command for the device and the creation of the response description with respect to an intrusiveness level of the spoken dialog system.

According to another exemplary embodiment and/or exemplary method of the present invention, the subcomponent is integrated with a response generator to adjust a translation of a response description into a sequence of at least one of words and acoustic icons.

According to another exemplary embodiment and/or exemplary method of the present invention, the subcomponent is configured to adjust the translation of the response description into the sequence of at least one of the words and acoustic icons with respect to an amount of response to be provided to a user of the spoken language dialog system.

According to another exemplary embodiment and/or exemplary method of the present invention, the subcomponent is configured to adjust the translation of the response description into the sequence of the at least one of the words and acoustic icons with respect to a choice of the at least one of the words and acoustic icons.

According to another exemplary embodiment and/or exemplary method of the present invention, the subcomponent is integrated with a text-to-speech module to adjust a conversion of a sequence of at least one words into digitalized acoustic samples.

According to another exemplary embodiment and/or exemplary method of the present invention, the subcompo-
nent is configured to adjust the conversion of the sequence of words into digitalized acoustic samples with respect to prosody control.

According to another exemplary embodiment and/or exemplary method of the present invention, the subcomponent is configured to adjust the conversion of the sequence of words into digitalized acoustic samples with respect to a voice characteristic.

According to another exemplary embodiment and/or exemplary method of the present invention, the at least one parameter is organized into at least one profile.

According to another exemplary embodiment and/or exemplary method of the present invention, an interface is provided to set at least one of the at least one parameter and the at least one profile.

An exemplary embodiment and/or exemplary method of the present invention is directed to an arrangement to parameterize a spoken language dialog system, which includes a storage area to store at least one parameter value, and at least one subcomponent integrated with at least one module of the spoken language dialog system to access the at least one parameter value and to adjust an operation or output of the module based on the at least one parameter value.

An exemplary embodiment and/or exemplary method of the present invention, is directed to a spoken language dialog system, which includes a module to perform a subtask of the spoken dialog system, a storage area to store at least one parameter value, and a subcomponent arrangement integrated with the module to access the at least one parameter value and to adjust an operation or output of the module based on the at least one parameter value.

According to another exemplary embodiment and/or exemplary method of the present invention, the module is configured to perform an analysis of at least one of a sequence of words and directed group of word hypothesis for syntactic and semantic structure, and the subcomponent arrangement is configured to adjust the analysis with respect to a user speaking style.

According to another exemplary embodiment and/or exemplary method of the present invention, the module is configured to at least one of assemble a command for a device and create of a response description, and the subcomponent arrangement is configured to adjust the at least one of the assembly of the command for the device and the creation of the response description with respect to one of a dialog style and intrusiveness of the spoken dialog system.

According to another exemplary embodiment and/or exemplary method of the present invention, the dialog style includes a relative response length.

According to another exemplary embodiment and/or exemplary method of the present invention, the module is configured to perform a translation of a response description into a sequence of at least one of words and acoustic icons, and the subcomponent arrangement is configured to adjust the translation with respect to one of an amount of response to be provide to a user of the spoken dialog system and a choice of the at least one of the words and acoustic icons.

According to another exemplary embodiment and/or exemplary method of the present invention, the module is configured to perform a conversion of a sequence of at least one of words into digitalized acoustic samples, and the subcomponent arrangement is configured to adjust the conversion with respect to at least one of prosody control and a voice characteristic.

DETAILED DESCRIPTION

Figure 1:
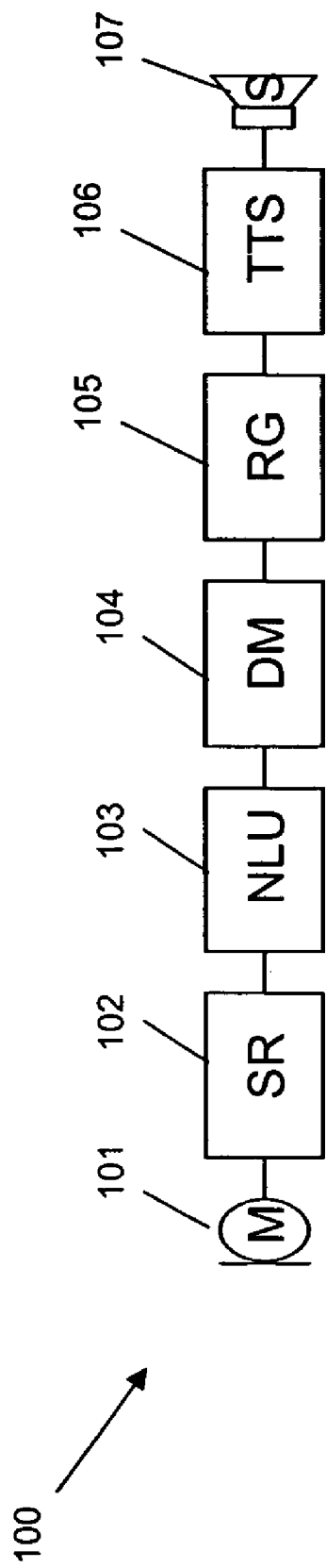
FIG. 1 shows an exemplary spoken language dialog system, which includes a number of modules that specialize on specific subtasks associated with receiving and understanding the meaning of what the user said, generating spoken responses to the user for further clarification, and issuing a command or query to a device or service as a result the dialog with the user.

FIG. 1 shows an exemplary spoken language dialog system 100, which includes a microphone (M) 101, a speech recognition (SR) module 102, a natural language understanding (NLU) module 103, a dialog manager (DM) 104, a response generator (RG) 105, a text-to-speech (TTS) module 106, and a speaker (S) 107. In this regard, each module 101 to 107 of the exemplary spoken language dialog system 100 specializes on a specific subtask associated with either attempting to understand the meaning of what the user said, generating spoken responses to the user for further clarification, or issuing a command or query to a device or service based on the understood meaning and further clarification.

In particular, the microphone 101 converts the acoustic signals of the user's utterance into digitized samples. The speech recognition module 102 converts the digitized samples of the user's utterance provided by the microphone 101 into the most probable sequence of words or, alternatively, into a directed graph of word hypotheses. The natural language understanding module 103 analyzes the sequence of words (or the hypothesis graph) for the syntactic and semantic structure. The dialog manager 104 assembles commands to an attached device (e.g., a radio) from the structured utterance, and/or creates descriptions of potential responses to the user, which may be used for confirmation, disambiguation or resolution of conflicting information in the user utterances. The response generator 105 translates the response description provided by the dialog manager 104 into a sentence (or string of words) in human understandable form.

The text-to-speech module 106 converts the sequence of words provided by the response generator 105 into digitized acoustic samples. In this regard, the text-to-speech module 106 may offer prosody markup language extensions to control aspects of the synthesized speech such as pronunciation, volume, pitch, rate, male/female voice, etc. (see e.g., W3C Speech Synthesis Markup Language Version 1.0: http://www.w3.org/Voice/2004/CR-speech-synthesis-200312128-diffmarked.html, which is incorporated by reference herein in its entirety). The speaker 107 converts the digitized acoustic samples provided by the text-to-speech module 106 into acoustic signals to be perceived by the user.

Figure 2:
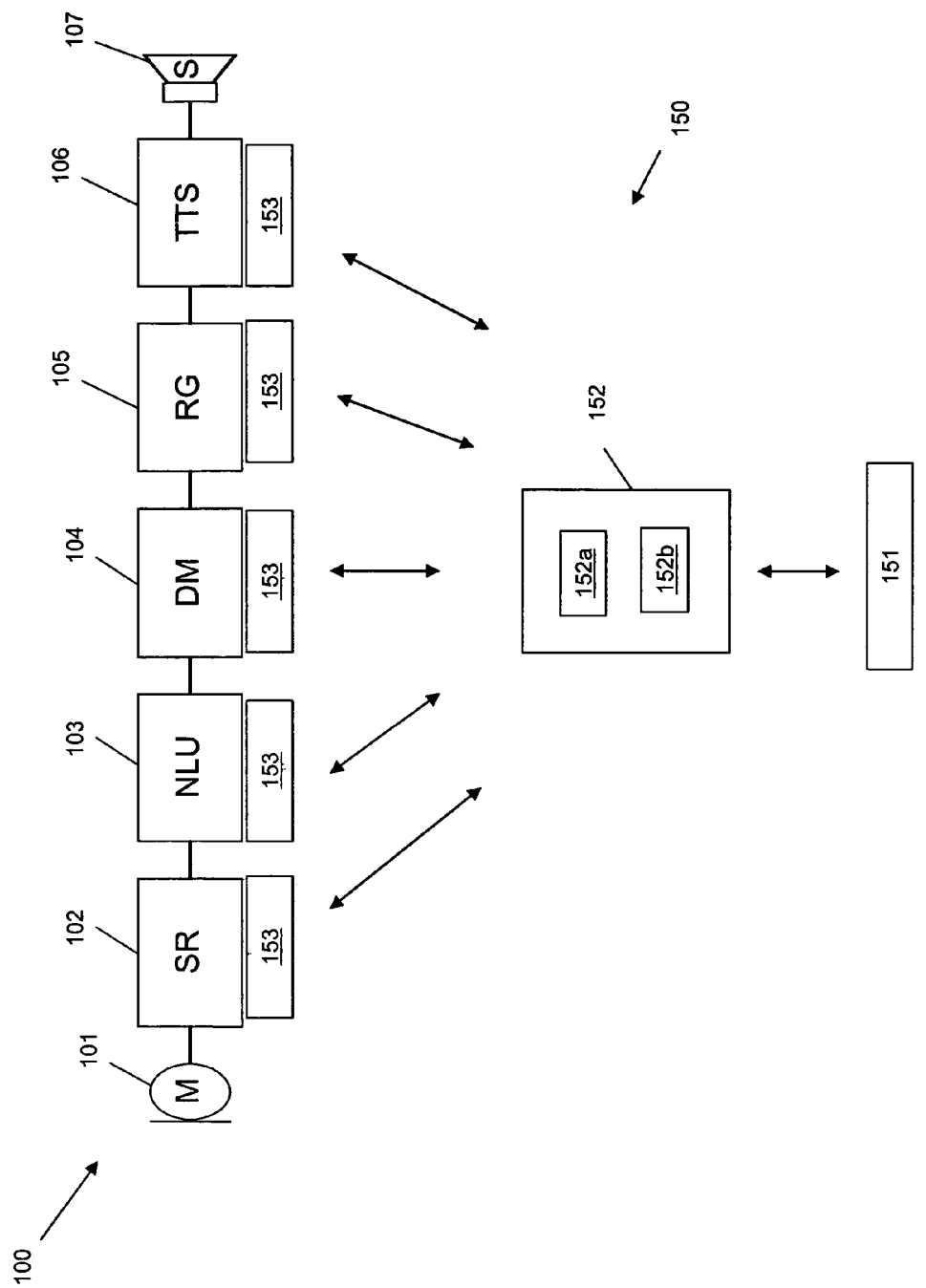
FIG. 2 shows an exemplary parameterization arrangement to parameterize the exemplary spoken language dialog system of FIG. 1.

FIG. 2 shows an exemplary parameterization arrangement 150 to parameterize the exemplary spoken language dialog system 100 of FIG. 1. The exemplary parameterization arrangement 150 includes an external interface 151 to input parameter values/settings, a storage area 152 to store the parameter values/settings and subcomponent arrangements 153 included or integrated with certain modules of the exemplary spoken language dialog system 100 to access the parameter values/settings and to adopt the value/setting within the modules. The storage area 152 includes a sub-storage area 152a to store manufacturer settings and a sub-storage 152b to store personalized settings.

The subcomponent arrangements 153 included with each module may be implemented, for example, via programmed software instructions that access the storage area 152 to retrieve manufacturer and/or personalized parameter values/setting, adjust the operation and/or output of the module based on the retrieved values, and update the personalized parameter values/settings based on interaction with the user. In this regard, certain adjustable parameters may be provided, for example, using the prosody markup language, or by modifying a strategy that the dialog manager 104 uses to create response descriptions, or by modifying a strategy that the response generator 105 uses to translate the responses, or by a combination of the above.

The exemplary parameterization arrangement 150 of FIG. 2 may be used to provide a variety of adjustable parameters, including, for example, the voice used for speech synthesis. In this regard, the voice may be filtered and/or modified to represent the voice of certain type of person, including, for example, a male voice, a female voice, the voice or an old or young person, or a person with a particular accent. The pitch of the voice may also be modified.

The adjustable parameters may also include prosody control. For example, the adjustable parameters may control intonation, rhythm, or tone of speech. The adjustable parameters may also control the speed of speech output. For example, the adjustable parameters may control a particular word or words in a particular manner, or according to a particular stress on particular words numerical/categorical (e.g., semantic—happy, serious) parameterization.

The adjustable parameters may also include verbosity, that is, the amount of speech response provided to the user. For example, the adjustable parameters may control whether all, none or only some utterances are confirmed, or whether the response should refer to only recently spoken items or repeat each spoken item every time.

The adjustable parameters may also determine the choice of words in formulating a response. For example, the adjustable parameters may control which words are included in a response so that the response may be perceived in particular manner, including, for example, whether the response is considered polite, direct, and/or casual.

The adjustable parameters may also control "intrusiveness", that is, the adjustable parameters may determine the importance of a particular external event for which to initiate a dialog that informs the user of the event. In this regard, the event may be, for example, an external event such a warning of an impending accident or an indication of a low fuel level.

The adjustable parameters may also control different styles of "earcons" (also known as acoustic icons) associated with certain system responses. For example, the adjustable parameters may control certain system responses that confirm a recognized utterance with a 'bleep' or play different tones for success/failure of selected atomic actions.

The adjustable parameters may also determine a dialog strategy, such as, for example, whether to fix one thing at a time, or to handle multiple tasks at the same time.

The adjustable parameters may also allow more constrained but more precise conversation or less constrained but less precise conversation. For example, to allow more constrained but more precise conversation the system may be adjusted to initiate conversation more often ("more system initiative"). Likewise, to allow less constrained but less precise conversation the system may be adjusted to initiate conversation less often ("more user-initiative").

Given the ability to adjust certain parameters of the exemplary spoken language dialog system 100, a manufacturer may also choose to expose some or all of the parameters to the user, allowing them to personalize these settings and thereby deviate from the standard behavior of the vehicle's model. In this regard, the settings may be personalized/derived algorithmically by using one or more of the user characteristics provided/detected by components in the exemplary dialog system 100. For example, the setup may be personalized for a specific user group (e.g. male or female from input provided by speech recognizer module 102), or for a specific user using biometrics (e.g., speaker identification/verification).

The setup may also be personalized for a particular user dialog style. For example, the setup may be personalized to provide control short/elaborate/terse—queries/responses, dialog turns taken per task.

The setup may also be personalized for a particular user speaking style. For example, the setup may be personalized to provide an impatient or patient speaking style using, for example, prosodical directives (e.g., impatient, patient syntactical directives), or monitoring the frequency of usage of a particular control component of the system (e.g., Push-To-Talk (PTT) button).

The parameter settings may be preconfigured into a group of profiles, allowing the user to choose a profile which determines a number of settings, rather than tune each setting individually. Users may also add their own new profiles to this group.

What is claimed is:

1. A computer-implemented method to parameterize a spoken language dialog system, the spoken language dialog system including a speech recognition module, a natural language understanding module, a dialog management module, a response generation module, and a text-to-speech module, the method comprising:
    detecting, by a computer processor, at least one characteristic of a speech input of a speaker using at least one of the speech recognition module and the natural language understanding module;
    setting, by the computer processor, at least one parameter value in a storage area in accordance with the detected at least one characteristic; and
    executing, by the computer processor, a subcomponent of one of the modules to subsequently access the set at least one parameter value and to adjust output of the spoken language dialog system based on the at least one parameter value;
    wherein the adjustment includes adjusting a stored intrusiveness level parameter of the dialogue system, and wherein, based on a comparison of an importance level of an external event and the intrusiveness level parameter of the dialogue system, the spoken language dialog system determines whether or not to initiate a dialog that informs the speaker of the external event.

2. The method of claim 1, wherein a subcomponent of the speech recognition module adjusts a conversion of a digitized acoustic sample into at least one of a sequence of words and a directed graph generated by the speech recognition module.

3. The method of claim 1, wherein a subcomponent of the natural language understanding module adjusts an analysis of at least one of a sequence of words and directed group of word hypothesis for syntactic and semantic structure.

4. The method of claim 3, wherein the subcomponent of the natural language understanding module is configured to adjust the analysis of at least one of a sequence of words and directed group of word hypothesis for syntactic and semantic structure with respect to a user speaking style.

5. The method of claim 1, wherein a subcomponent of the dialog management module adjusts at least one of an assembly of a command for a device and creation of a response description.

6. The method of claim 5, wherein the subcomponent of the dialog management module is configured to adjust the at least one of the assembly of the command for the device and the creation of the response description with respect to a dialog style of the spoken dialog system.

7. The method of claim 6, wherein the dialog style includes a relative response length.

8. The method of claim 6, wherein the subcomponent of the dialog management module is configured to adjust the at least one of the assembly of the command for the device and the creation of the response description with respect to the intrusiveness level of the spoken dialog system.

9. The method of claim 1, wherein a subcomponent of the response generation module adjusts a translation of a response description into a sequence of at least one of words and acoustic icons.

10. The method of claim 9, wherein the subcomponent of the response generation module is configured to adjust the translation of the response description into the sequence of at least one of the words and acoustic icons with respect to an amount of response to be provided to a user of the spoken language dialog system.

11. The method of claim 9, wherein the subcomponent of the response generation module is configured to adjust the translation of the response description into the sequence of the at least one of the words and acoustic icons with respect to a choice of the at least one of the words and acoustic icons.

12. The method of claim 1, wherein a subcomponent of the text-to-speech module adjusts a conversion of a sequence of at least one of words into digitalized acoustic samples.

13. The method of claim 12, wherein the subcomponent of the text-to-speech module is configured to adjust the conversion of the sequence of words into digitalized acoustic samples with respect to prosody control.

14. The method of claim 12, wherein the subcomponent of the text-to-speech module is configured to adjust the conversion of the sequence of words into digitalized acoustic samples with respect to a voice characteristic.

15. The method of claim 14, further comprising:
    providing an interface to set at least one of the at least one parameter and the at least one profile.

16. The method of claim 1, further comprising:
    organizing the at least one parameter into at least one profile.

17. The method of claim 1, wherein the external event is one of a warning of an impending accident and an indication of a low fuel level of a vehicle.

18. The method of claim 1, further comprising:
    in accordance with the detection, categorizing the speaker as belonging to one of a plurality of speaker categories;
    wherein:
        the storage area stores a plurality of parameter values;
        each of the plurality of parameter values is associated with a respective one of the plurality of speaker categories; and
        the at least one parameter is a subset of the plurality of parameter values that correspond to the speaker category to which the speaker has been categorized as belonging, the access of the at least one parameter by the subcomponent being based on the categorization of the speaker.

19. The method of claim 1, wherein the device is a motor vehicle.

20. The method of claim 19, wherein the spoken language dialog system is on board the motor vehicle.

21. The method of claim 20, wherein different settings of the at least one parameter are provided to a user for user-selection of one of the different settings.

22. The method of claim 1, wherein the intrusiveness level indicates a threshold importance required for initiating the dialog that informs the speaker of the external event.

23. A hardware arrangement configured to parameterize a spoken language dialog system, the spoken language dialog system including a speech recognition module, a natural language understanding module, a dialog management module, a response generation module, and a text-to-speech module, the arrangement comprising:
a storage area to store at least one parameter value; and
a computer processor;
wherein:
the computer processor is configured to:
detect at least one characteristic of a speech input of a speaker using at least one of the speech recognition module and the natural language understanding module;
set the at least one parameter value in the storage area in accordance with the detected at least one characteristic; and
execute a subcomponent integrated with one of the modules to, subsequent to the setting of the at least one parameter value, access the set at least one parameter value and to adjust output of the spoken language dialog management system based on the accessed at least one parameter value; and
the adjustment of the output includes adjusting a stored intrusiveness level parameter of the dialogue system, and wherein, based on a comparison of an importance level of an external event and the intrusiveness level parameter of the dialogue system, the spoken language dialog system determines whether or not to initiate a dialog that informs the speaker of the external event.

24. The arrangement of claim 23, wherein a subcomponent of the speech recognition module adjusts a conversion of a digitized acoustic sample into at least one of a sequence of words and a directed graph generated by the speech recognition module.

25. The arrangement of claim 23, wherein a subcomponent of the natural language understanding module adjusts an analysis of at least one of a sequence of words and directed group of word hypothesis for syntactic and semantic structure.

26. The arrangement of claim 25, wherein the subcomponent of the natural language understanding module is configured to adjust the analysis of at least one of a sequence of words and directed group of word hypothesis for syntactic and semantic structure with respect to a user speaking style.

27. The arrangement of claim 23, wherein a subcomponent of the dialog management module adjusts at least one of an assembly of a command for a device and creation of a response description.

28. The arrangement of claim 27, wherein the subcomponent of the dialog management module is configured to adjust the at least one of the assembly of the command for the device and the creation of the response description with respect to a dialog style of the spoken dialog system.

29. The arrangement of claim 28, wherein the dialog style includes a relative response length.

30. The arrangement of claim 27, wherein the subcomponent of the dialog management module is configured to adjust the at least one of the assembly of the command for the device and the creation of the response description with respect to the intrusiveness level of the spoken dialog system.

31. The arrangement of claim 23, wherein a subcomponent of the response generation module adjusts a translation of a response description into a sequence of at least one of words and acoustic icons.

32. The arrangement of claim 31, wherein the subcomponent of the response generation module is configured to adjust the translation of the response description into the sequence of at least one of the words and acoustic icons with respect to an amount of response to be provide to a user of the spoken dialog system.

33. The arrangement of claim 31, wherein the subcomponent of the response generation module is configured to adjust the translation of the response description into the sequence of the at least one of the words and acoustic icons with respect to a choice of the at least one of the words and acoustic icons.

34. The arrangement of claim 23, wherein a subcomponent of the text-to-speech module adjusts a conversion of a sequence of at least one of words into digitalized acoustic samples.

35. The arrangement of claim 34, wherein the subcomponent of the text-to-speech module is configured to adjust the conversion of the sequence of words into digitalized acoustic samples with respect to prosody control.

36. The arrangement of claim 34, wherein the subcomponent of the text-to-speech module is configured to adjust the conversion of the sequence of words into digitalized acoustic samples with respect to a voice characteristic.

37. A spoken language dialog system, comprising:
a storage area to store at least one parameter value; and
a computer processor configured to execute:
a plurality of modules to perform subtasks of the spoken language dialog system, the plurality of modules including a speech recognition module, a natural language understanding module, a dialog management module, a response generation module, and a text-to-speech module; and
a subcomponent integrated with the one of the modules to access the at least one parameter value and to adjust an operation or output of the spoken language dialog system based on the at least one parameter value;
wherein:
at least one characteristic of a speech input of a speaker is detected using at least one of the speech recognition module and the natural language model;
the at least one parameter value is set in storage in accordance with the detected characteristic;
the computer processor is configured to execute the subcomponent to, subsequent to the setting of the at least one parameter value, access the set at least one parameter value and to adjust output of the spoken language dialog system based on the accessed at least one parameter value; and
the adjustment of the output includes adjusting a stored intrusiveness level parameter of the dialogue system, and wherein, based on a comparison of an importance level of an external event and the intrusiveness level parameter of the dialogue system, the spoken language dialog system determines whether or not to initiate a dialog that informs the speaker of the external event.

38. The spoken language dialog system of claim 37, wherein the natural language understanding module is configured to perform an analysis of at least one of a sequence of words and directed group of word hypothesis for syntactic and semantic structure, and a subcomponent of the natural language understanding module is configured to adjust the analysis with respect to a user speaking style.

39. The spoken language dialog system of claim 37, wherein the dialog management module is configured to at least one of assemble a command for a device and create of a response description, and a subcomponent of the dialog management module is configured to adjust the at least one of the assembly of the command for the device and the creation of the response description with respect to one of a dialog style and intrusiveness of the spoken dialog system.

40. The spoken language dialog system of claim 39, wherein the dialog style includes a relative response length.

41. The spoken language dialog system of claim 37, wherein the response generation module is configured to perform a translation of a response description into a sequence of at least one of words and acoustic icons, and a subcomponent of the response generation module is configured to adjust the translation with respect to one of an amount of response to be provided to a user of the spoken dialog system and a choice of the at least one of the words and acoustic icons.

42. The spoken language dialog system of claim 37, wherein the text-to-speech module is configured to perform a conversion of a sequence of at least one of words into digitalized acoustic samples, and a subcomponent of the text-to-speech module is configured to adjust the conversion with respect to at least one of prosody control and a voice characteristic.

43. A computer-implemented method to parameterize a spoken language dialog system, the spoken language dialog system including a speech recognition module, a natural language understanding module, a dialog management module, a response generation module, and a text-to-speech module, the method comprising:
  detecting, by a computer processor, at least one characteristic of a speech input of a speaker using at least one of the speech recognition module and the natural language module;
  setting, by the computer processor, at least one parameter value in a storage area in accordance with the detected at least one characteristic; and
  executing, by the computer processor, a subcomponent of the spoken language dialog system to subsequently access the set at least one parameter value and adjust output of the spoken language dialog system based on the at least one parameter value;
  wherein the adjustment includes adjusting a stored intrusiveness level parameter of the dialogue system, and wherein, based on a comparison of an importance level of an external event and the intrusiveness level parameter of the dialogue system, the spoken language dialog system determines whether or not to initiate a dialog that informs the speaker of the external event.

44. A computer-implemented method to parameterize a spoken language dialog system, the spoken language dialog system including a speech recognition module, a natural language understanding module, a dialog management module, a response generation module, and a text-to-speech module, the method comprising:
  detecting, by a computer processor, at least one characteristic of a speech input of a speaker using at least one of the speech recognition module and the natural language understanding module;
  setting, by the computer processor, at least one parameter value in a storage area in accordance with the detected at least one characteristic;
  executing, by the computer processor, a subcomponent of one of the modules to subsequently access the set at least one parameter value;
  adjusting a stored intrusiveness level parameter of the dialogue system; and
  for each of a plurality of external events:
    comparing the intrusiveness level parameter of the dialogue system with a predefined importance level of the respective external event; and
    determining whether or not to initiate a dialog that informs the speaker of the respective external event based on the comparison.

* * * * *